No. 829,148. PATENTED AUG. 21, 1906.
A. L. HADLEY.
RHEOSTAT.
APPLICATION FILED DEC. 16, 1904.
Fig. 1.
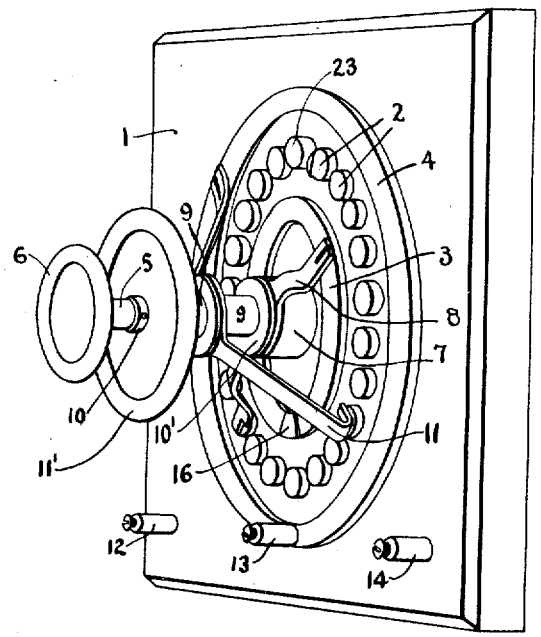
Fig. 2.
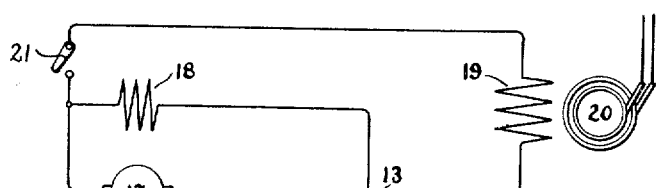
Fig. 4.
Fig. 3.
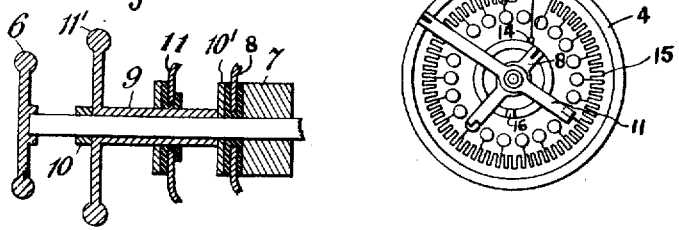
Witnesses.
Irving E. Steers.
Arthur Oxford.
Inventor.
Arthur L. Hadley,
by Albert G. Davis
Atty.

UNITED STATES PATENT OFFICE.

ARTHUR L. HADLEY, OF FORT WAYNE, INDIANA, ASSIGNOR TO GENERAL ELECTRIC COMPANY, A CORPORATION OF NEW YORK.

RHEOSTAT.

No. 829,148.  Specification of Letters Patent.  Patented Aug. 21, 1906.

Application filed December 16, 1904. Serial No. 237,102.

*To all whom it may concern:*

Be it known that I, ARTHUR L. HADLEY, a citizen of the United States, residing at Fort Wayne, county of Allen, State of Indiana, have invented certain new and useful Improvements in Rheostats, of which the following is a specification.

This invention relates to rheostats, with particular reference to rheostatic devices for controlling the voltage or speed of a separately-excited dynamo-electric machine by varying its field strength.

The object of my invention is to utilize the same resistance to regulate both the field of a separately-excited dynamo-electric machine and the field of the exciter therefor. I effect this by a plurality of movable contacts playing over the same resistance and independently adjustable to connect the two field-coils in parallel relation to the exciter-armature.

In carrying out my invention I provide an adjustable resistance in the circuit of the field of the separately-excited machine and means for including a variable portion of this same resistance in the field-circuit of the exciter to regulate its strength. The comparatively heavy current for the field of the dynamo or motor causes a large drop of potential through the resistance, though the latter is of relatively small ohmic value, and the whole of this resistance or the whole and a small additional resistance may be included in the field-circuit of the exciter to give the desired reduction in voltage across its terminals. Thus a single rheostat regulates both the dynamo and the exciter fields, effecting a great saving in the initial cost of the installation and reducing the space necessary on a switchboard or other support for the voltage-regulating devices.

Another advantage incident to the use of my invention is that the voltage of the machine can be regulated with greater nicety, since adjustment on a common resistance of either field modifies the other both by a change of voltage at the exciter-terminals and the changing values of current due to the relative ohmic values of resistance cut into the two circuits, and therefore the number of possible field adjustments of the dynamo-electric machine, and hence the number of steps in the voltage regulation, greatly exceeds that obtained with two distinct rheostats of the same capacity and total number of steps. Also a single rheostat constructed in accordance with my invention permits of operating the exciter at its best or normal running voltage a greater part of the time.

The novel features of my invention will be definitely indicated in the claims appended hereto.

The details of construction and the mode of operation of my improved rheostatic regulating device will be better understood by reference to the following description, taken in connection with the accompanying drawings, in which—

Figure 1 is a perspective view of the face-plate of the device. Fig. 2 is a diagram of the circuits. Fig. 3 is a detail of the contacts, and Fig. 4 is a detail sectional view showing the arrangement of the contact-arm.

Referring to Fig. 1, which shows the preferred embodiment of my invention, 1 indicates a face-plate, of soapstone or other insulating material, on which a plurality of studs 2 are mounted around the circumference of a circle. Two studs at the top of the circle, between which is an open-circuiting or dead stud, are connected to the terminals of a resistance, and the remaining studs are connected to the resistance at intervals throughout its length. Concentric with this circle are two rings 3 and 4, of conducting material, one outside and the other inside the ring of studs 2, and at the center of the rings is pivotally mounted a shaft 5, having a handle 6. Secured to the shaft 5 above a suitable collar 7 and preferably insulated therefrom is a rheostat-arm 8, one end of which bears upon the inner ring 3 and the other end of which is adapted to engage the inner portions of the studs 2. Loose on shaft 5 and suitably positioned between a collar 10, secured on shaft 5, and a washer 10', is a sleeve 9, carrying a handle 11', and secured to this sleeve, but insulated therefrom, is a second rheostat-arm 11, one end of which bears upon the outer ring 4 and the other end of which is adapted to engage the outer portions of the studs 2. The two rheostat-arms are movable independently of each other by their respective operating-handles, but cannot be moved past each other, though both may bear on the same studs. Mounted on the face-plate 1 are two binding-posts 12 and 14, the former of which is connected to the first stud 2, and hence to one terminal of the resistance 15, and the latter of which is connected to the innner ring 3. A third binding-post 13 is secured to the outer ring 4 and serves as a stop for the arm 11 as well as a binding-post for making connection to the ring 4. In the inner ring 3 is a raised portion, as indicated at 16 in Fig. 1, which serves as a stop for the arm 8.

In order to prevent the arm for the exciter-field from moving from the position of maximum exciter-field resistance past the arm for the generator-field resistance, the ends of the rheostat-arms 8 and 11, which bear on the studs 2, are each cut away on one side so that they overlap, although it may not always be necessary that they do so. The alternator-field circuit is usually opened by a separate switch, as indicated at 21. The exciter-field is preferably opened at the dead-stud on the rheostat. In order that the operator may know when he is moving the exciter-field arm from the position of maximum resistance to the open-circuit position, I provide a partial stop to arrest the movement and make an extra turning effort necessary. The last stud 2 is provided with a raised portion on one edge, as indicated at 22, Fig. 3, and the dead-stud 23 is of the same height as this raised portion. Thus when the operator returns the arm 11 toward the off position the extra effort necessary to move the arm over the raised portion 22 brings to his attention the fact that he is then opening the exciter-field circuit. The arm 8 for the generator-field cannot be moved onto the open-circuiting stud, as it is arrested by the stop 16.

When the regulating device is used to regulate the voltage of a separately-excited dynamo-electric machine—as, for instance, an alternating-current generator—the various parts are connected as shown in Fig. 2. One side of the armature 17 of the exciter is connected to binding-post 12, and hence to one terminal of the resistance 15. One side of the field-winding 18 of the exciter is connected to binding-post 13, and hence to the outer ring 4. The other sides of the armature 17 and field 18 are connected together and to one terminal of the field-windings 19 of the alternator 20, the other terminal of which is connected to binding-post 14, and hence to the inner ring 3. The machine is preferably started with the arm 11 on the open-circuiting stud 23 and the arm 8 on the first stud 2, so that when the generator-field circuit is closed at the switch the maximum resistance is in circuit. The exciter-field is then closed with the maximum resistance in by moving the arm 11 onto the first stud 2. The arm 8 is then moved around to cut out the resistance 15, and thus raise the generator voltage to approximately the desired voltage. Then by moving the arm 11 around over the contacts a finer adjustment of the generator voltage can be obtained.

Current from the exciter-armature flows through the main circuit of the alternator-field winding 19 to binding-post 14, ring 3, arm 8, through so much of resistance 15 as is cut into circuit by the arm, to binding-post 12, and then back to armature 17. A portion of the current from the armature 17 flows through the derived circuit of the exciter-field 18 to binding-post 13, ring 4, arm 11, resistance 15, to binding-post 12, and back to armature 17. The current flowing through the alternator-field 19 is very large relatively to that flowing in the exciter-field 18, and therefore the drop in voltage through so much of the resistance 15 as is in circuit is large even though the ohmic value of that resistance is small. The desired voltage across the terminals of the exciter-field 18 can be obtained very exactly, as moving the arm 11 from one stud to another of those over which the arm 8 has passed changes the exciter-field resistance very slightly, due to the low ohmic value of resistance 15, whereas the large drop of potential is obtained by including in the exciter-field circuit the resistance which carries the large current for the alternator-field. If it is desired to change the voltage at the terminals of the alternator 20, the arm 8 may be moved over the contacts 2 by handle 6 to increase or diminish the resistance in the circuit of the alternator-field 19, thus changing the current-flow in the field-winding 19, or the arm 11 may be moved by handle 11' to vary the resistance in the circuit of the exciter-field 17, thus varying the voltage at the terminals of the exciter and in this way changing the current in the alternator-field 19. Thus a single rheostat regulates the field strength of both the exciter and the alternator, effecting a great saving in the initial outlay and the space required for the installation. Moreover, this device is more readily operated and permits of regulating the voltage of the alternator with greater accuracy than two separate and distinct rheostats having the same number of contacts and the same resistance capacity.

I do not wish to be understood as limited to the precise arrangement which I have herein illustrated and described, as various modifications can be made therein, all of which I consider within the scope of my invention and which I aim to cover in the claims appended hereto.

What I claim as new, and desire to secure by Letters Patent of the United States, is—

1. The combination of the separately-excited circuit of a dynamo-electric machine, a branch circuit derived therefrom including the exciter-field of said machine, a resistance, means for including a variable portion of the resistance in the main circuit, and a contact to which one terminal of the exciter-field circuit is connected movable over the resistance to include a variable portion of the same resistance in the latter circuit.

2. The combination of a separately-excited dynamo-electric machine, an exciter therefor, a resistance in series with the field of said machine, a contact in electrical connection with said resistance and movable to vary its relation thereto, and a second movable contact forming a connection from said resistance to one terminal of the field of the exciter.

3. The combination of a separately-excited dynamo-electric machine, an exciter therefor, a resistance, a movable contact for connecting a variable portion of the resistance in series with the field of said machine, a second contact in electrical connection with said resistance, and a connection from said contact to one terminal of the field of said exciter.

4. The combination of a separately-excited dynamo-electric machine, an exciter therefor, a resistance, a movable contact for connecting a variable portion of said resistance in series with the field of said machine, a second contact in electrical connection with said resistance and movable to vary its relation thereto, and a connection from said second contact to one terminal of the field of the exciter.

5. The combination of a separately-excited dynamo-electric machine, an exciter therefor, and a single variable resistance to regulate the resistance of both the field-circuit of the dynamo-electric machine and the field-circuit of the exciter.

6. The combination of a separately-excited dynamo-electric machine, an exciter therefor, a resistance connected to the armature of the exciter, and two contacts in electrical connection with said resistance and movable to vary their relation thereto, one connected to one terminal of the field of the dynamo-electric machine and the other to one terminal of the field of the exciter.

7. The combination of a separately-excited dynamo-electric machine, an exciter therefor, a resistance, two rheostat-arms therefor movable to vary the resistance in the field-circuits of said machine and exciter respectively, and means to prevent one of said arms from being moved past the other arm.

8. The combination of a separately-excited dynamo-electric machine, an exciter therefor, a resistance, two rheostat-arms therefor movable to vary the resistance in the field-circuits of said machine and exciter respectively, and means for providing an increased resistance to the movement of one of said arms when in a definite position.

9. The combination of a work-circuit, a branch circuit derived therefrom, a resistance, two arms independently movable to connect variable portions of the resistance to each of said circuits, means whereby one of said arms may be moved to open one of said circuits, and means for providing an increased resistance to the movement of said arm to the open-circuiting position.

10. The combination of the separately-excited field-circuit of a dynamo-electric machine, a branch circuit derived therefrom including the exciter-field, a resistance, two arms independently movable to connect the variable portion of the resistance in each of said circuits, and means to prevent one of said arms from being moved past the other.

In witness whereof I have hereunto set my hand this 10th day of December, 1904.

ARTHUR L. HADLEY.

Witnesses:
JAMES J. WOOD,
THOS. W. BEHAN.